(12) United States Patent
Kim

(10) Patent No.: US 7,495,710 B2
(45) Date of Patent: Feb. 24, 2009

(54) DISPLAY APPARATUS AND METHOD FOR REPRODUCING COLOR THEREWITH

(75) Inventor: Hee Chul Kim, Gumi-si (KR)

(73) Assignee: LG Electronics Inc., Seoul (KR)

( * ) Notice: Subject to any disclaimer, the term of this patent is extended or adjusted under 35 U.S.C. 154(b) by 591 days.

(21) Appl. No.: 11/176,672

(22) Filed: Jul. 8, 2005

(65) Prior Publication Data

US 2006/0007360 A1      Jan. 12, 2006

(30) Foreign Application Priority Data

Jul. 9, 2004    (KR) ................ 10-2004-0053537

(51) Int. Cl.
*H04N 9/64* (2006.01)
*H04N 9/73* (2006.01)

(52) U.S. Cl. ................................. 348/652
(58) Field of Classification Search .......... 348/652–655
See application file for complete search history.

(56) References Cited

U.S. PATENT DOCUMENTS 5,146,323 A * 9/1992 Kobori et al. ............... 358/527

6,249,317 B1 * 6/2001 Hashimoto et al. .......... 348/364

FOREIGN PATENT DOCUMENTS

JP       2001-103504       4/2001

OTHER PUBLICATIONS

Chinese Office Action dated Mar. 9, 2007.

* cited by examiner

*Primary Examiner*—M. Lee
(74) *Attorney, Agent, or Firm*—Ked & Associates LLP

(57) ABSTRACT

A display apparatus includes a tuner for selecting a desired channel; a decoder for decoding broadcasting signals (Y, U, V) inputted from the selected channel; a video processing unit for processing the decoded broadcasting signals into (R, G, B) signals; a gain adjustment unit for adjusting the gain value of the (R, G, B) signals processed by the video processing unit; a display unit for displaying the (R, G, B) signals the gain of which has been adjusted; and a control unit for detecting skin color from the (R, G, B) signals processed by the video processing unit and calculating luminance signal level to correct the luminance signal level of the (R, G, B) signals. The display apparatus can accurately correct skin color in low luminance level.

13 Claims, 7 Drawing Sheets

DISPLAY APPARATUS AND METHOD FOR REPRODUCING COLOR THEREWITH

BACKGROUND OF THE INVENTION

1. Field of the Invention

The present invention relates generally to a display apparatus and a method for reproducing colors therewith, and more particularly, to a display apparatus adapted to detect skin color from (R, G, B) video signals and calculate luminance signal level to correct the luminance signal level of the (R, G, B) video signals and a method for reproducing colors therewith.

2. Description of the Related Art

In a color TV system, it is an object to reproduce images on a display device in such a manner that the brightness of the images is proportional to the luminance of the original scene, which has received the standard lighting, and the colors thereof are the same as in the chromaticity coordinate of the original scene.

In the case of a National Television Standards Committee (NTSC) color TV system, it is requested that ideal imaging characteristics are obtained from a standard camera (means for obtaining images) based on an NTSC standard monitor. A TV set reproduces the same chromaticity coordinate as in the original scene, which has been illuminated by C light source.

However, the phosphorescent substance and the standard white color of most current color TV sets have variously deviated from that of the NTSC standards. This is because the screen was dark due to the low luminous efficiency of the phosphorescent substance, when the NTSC standard specifications were established, and other phosphorescent substances having better luminous efficiency have been used. In addition, the color temperature of the standard white color has been raised for a brighter screen.

For these reasons, TV manufacturers in the USA and Japan chose 9,300K as the standard white color of TV sets in 1958, when P22-series phosphorescent substance was used for the first time, and have produced TV sets which reproduce colors based on that standard white.

Afterwards, it has become a trend in Korean or Japan, wherein orange fluorescent lamps of about 6,000K are widely used for indoor lighting, to arbitrarily choose the standard white color of TV sets from a range between 11,000K and 13,000K, which is higher than 9,300K.

As the standard white color of the transmission side (camera for obtaining video signals) differs from that of the reception side (display), color reproduction distortion occurs naturally.

As TV signal sources, public broadcasting, such as NTSC broadcasting or HDTV broadcasting, and various signal sources having different standards, such as DVD or digital still camera, coexist. Therefore, gamma processing must be performed while considering the TV set signal sources having various formats and standards, when transmitting TV signals, and the display characteristics of the display device (CRT), when making signals of each signal source.

In addition, TV sets must consider the gamma processing of the transmission side when reproducing colors. Otherwise, distortion occurs during color reproduction and the fidelity to the original colors degrades drastically.

Besides the above-mentioned problems, deviation of the phosphorescent substance coordinate of the transmission-side standard monitor from that of the TV sets is another main cause of chromaticity error.

Therefore, original colors can be reproduced with fidelity only when the type of the input signal source and that of the video display device are fully considered together with the camera's gamma characteristics of the transmission side during color reproduction.

A TV system according to the prior art will now be described with reference to the accompanying drawings.

FIG. 1 is a block diagram showing the construction of a TV transmission/reception system to illustrate the construction of a transmission/reception apparatus of a conventional TV system, FIG. 2 shows the trajectories of colors having the same phase on x, y coordinate system, FIG. 3 shows iso-hue and iso-chroma trajectories when the value is 7 in a Munsell system, and FIG. 4 shows iso-hue and iso-chroma trajectories when the value is 9 in a Munsell system.

In a conventional TV system, color signals are processed in the transmission side as follows: a camera lens 10 obtains images from an object illuminated by a light source. The obtained images pass through an optical distributor 20 and red, green, and blue sensors 30, 31, and 32 having an optical filter function to be sensed as red (R), green (G), and blue (B) signals.

The sensed R, G, B signals pass through a gain adjustment unit 40 for proper camera gain adjustment and a gamma correction unit 50 for gamma correction. The R, G, B video signals, after gamma correction, are encoded by an encoder 60 and are transmitted to the reception side via a transmission unit 70.

Color signals are processed in the reception side as follows: signals transmitted via the transmission unit 70 of the transmission side are received and decoded by a receiver/decoder 80. The decoded R, G, B signals pass through a display gain adjustment unit 90 for proper R, B, B gain adjustment and are displayed on a CRT 100 so that the viewer can watch images.

The imaging apparatus of the transmission side or the display apparatus of the reception side can image or reproduce only a limited range of colors, in contrast to natural colors humans can sense, which is referred to as the color reproduction gamut of the apparatus.

If the color reproduction gamut of the imaging apparatus is identical to that of the display apparatus, the display apparatus can reproduce the same colors as imaged by the imaging apparatus but, if different, it cannot reproduce the same colors.

When the color reproduction gamut of the signal source is different from that of the display apparatus, particularly, the display apparatus chooses a suitable color from its own color reproduction gamut, which corresponds to the color from the signal source, and reproduces it. When colors are reproduced in this manner, the colors from the signal source and the reproduced colors appear to be different from each other in the Munsell system which is based on the human vision.

In FIG. 2, a number of colors including "jap. girl", "white flesh tone", and "yellow" are shown based on density and luminance while varying their color reproduction gamut. It is clear that the density and luminance of the colors change as their color reproduction gamut varies, even when they have the same phase. In other words, colors having a different color reproduction gamut appear as different colors in the Munsell system, even when they have the same phase.

As shown in x, y coordinate system of FIG. 2, colors having the same phase exhibit different hue characteristics when the chroma level is low, but do not when the chroma level is high.

When the trajectories of colors are drawn based on the color density and luminance, which are perceived to have the same hue by human vision, they appear to have different hues as shown in FIGS. 3 and 4.

Such characteristics can be easily understood from FIGS. 3 and 4 which illustrate iso-hue and iso-chroma trajectories when the value is 7 in a Munsell system and when the value is 9, respectively, as well as from FIG. 2 which illustrates the iso-phase color trajectories in the TV system shown in FIG. 2.

Therefore, when colors having the same phase are reproduced based on luminance according to the prior art, a great difference in hue is noticed by the viewer when the luminance signal level is low, although there is little problem when the luminance signal level is high.

SUMMARY OF THE INVENTION

The present invention is directed to that substantially obviates one or more problems due to limitations and disadvantages of the related art.

It is an object of the present invention to provide a display apparatus adapted to detect skin color from (R, G, B) video signals and calculate luminance signal level to correct the luminance signal level of the (R, G, B) video signals and a method for reproducing colors therewith.

To achieve this object and other advantages in accordance with the purpose of the invention, as embodied and broadly described herein, there is provided a display apparatus including a tuner for selecting a desired channel; a decoder for decoding broadcasting signals (Y, U, V) inputted from the selected channel; a video processing unit for processing the decoded broadcasting signals into (R, G, B) signals; a gain adjustment unit for adjusting the gain value of the (R, G, B) signals processed by the video processing unit; a display unit for displaying the (R, G, B) signals the gain of which has been adjusted; and a control unit for detecting skin color from the (R, G, B) signals processed by the video processing unit and calculating luminance signal level to correct the luminance signal level of the (R, G, B) signals.

According to another aspect of the present invention, there is provided a method for reproducing colors with a display apparatus including the steps of (a) processing broadcasting signals into (R, G, B) video signals; (b) detecting skin color from the (R, G, B) signals; (c) calculating the luminance signal level of the (R, G, B) signals; and (d) correcting the luminance signal level of the (R, G, B) signals.

Additional advantages, objects, and features of the invention will be set forth in part in the description which follows and in part will become apparent to those having ordinary skill in the art upon examination of the following or may be learned by practicing the invention. The objectives and other advantages of the invention may be realized and attained by the structure particularly pointed out in the written description and claims hereof as well as the appended drawings.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENT

Reference will now be made in detail to the preferred embodiment of the present invention, examples of which are illustrated in the accompanying drawings. Wherever possible, the same reference numbers will be used throughout the drawings to refer to the same or like parts.

Hereinafter, according to the present invention will be explained with reference to the accompanying drawings.

Figure 1:
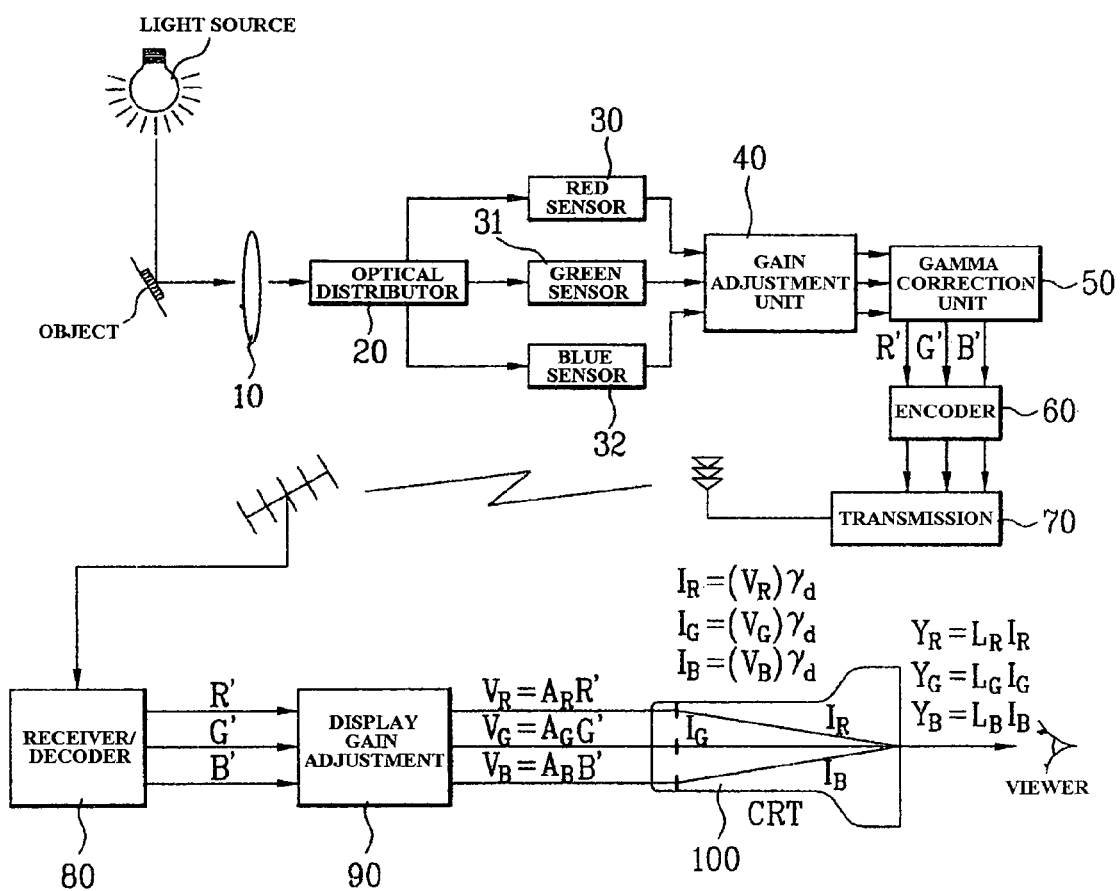
FIG. 1 is a block diagram showing the construction of a TV transmission/reception system to illustrate the construction of a transmission/reception apparatus of a conventional TV system.
Figure 2:
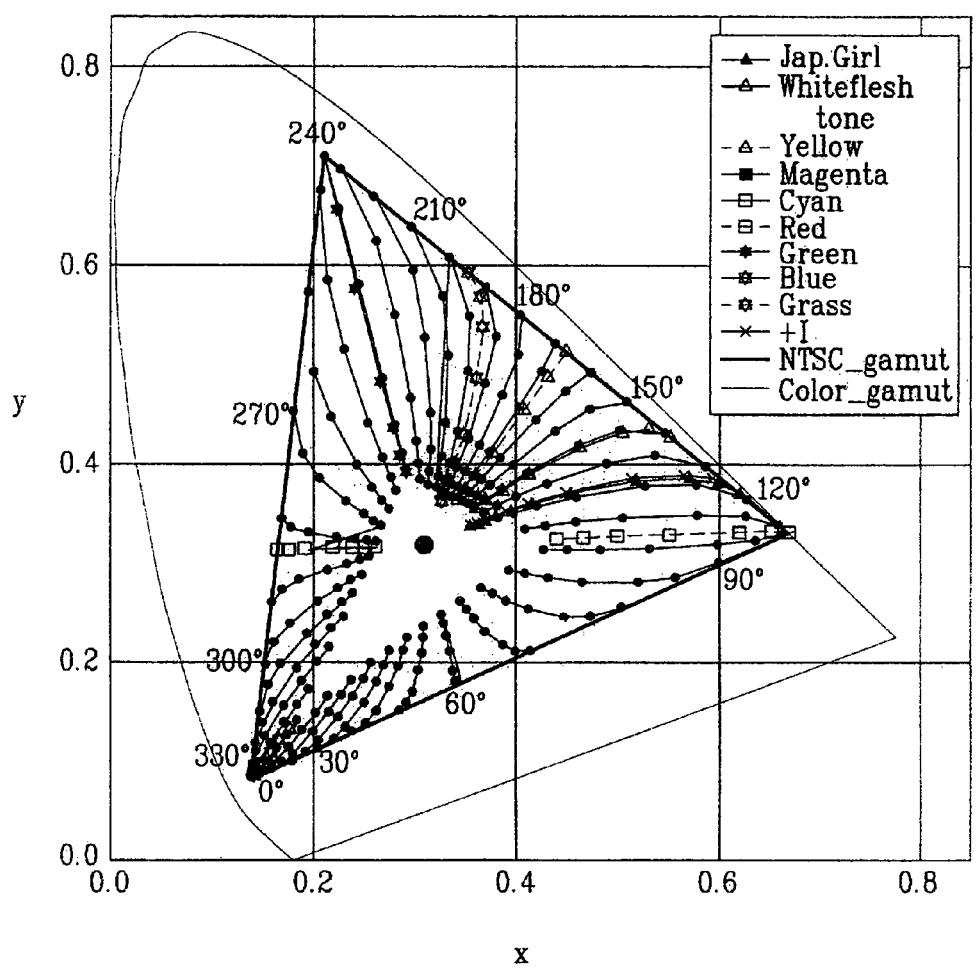
FIG. 2 shows the trajectories of colors having the same phase on x, y coordinate system.
Figure 3:
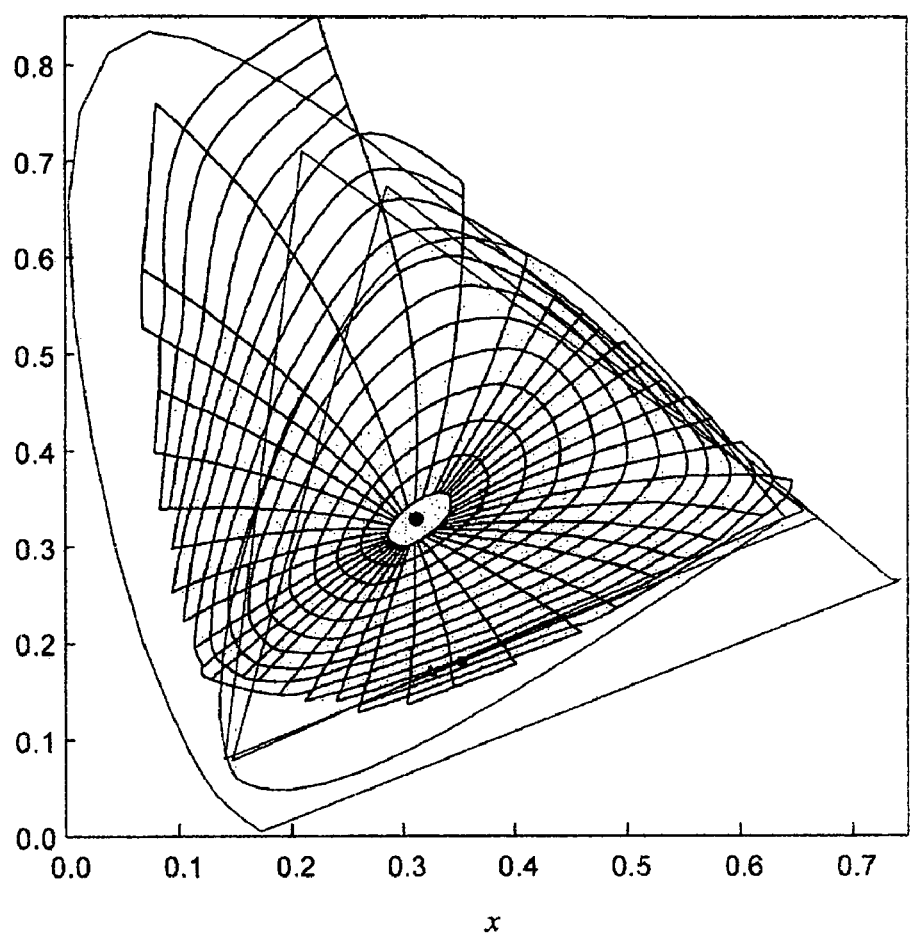
FIG. 3 shows iso-hue and iso-chroma trajectories when the value is 7 in a Munsell system.
Figure 4:
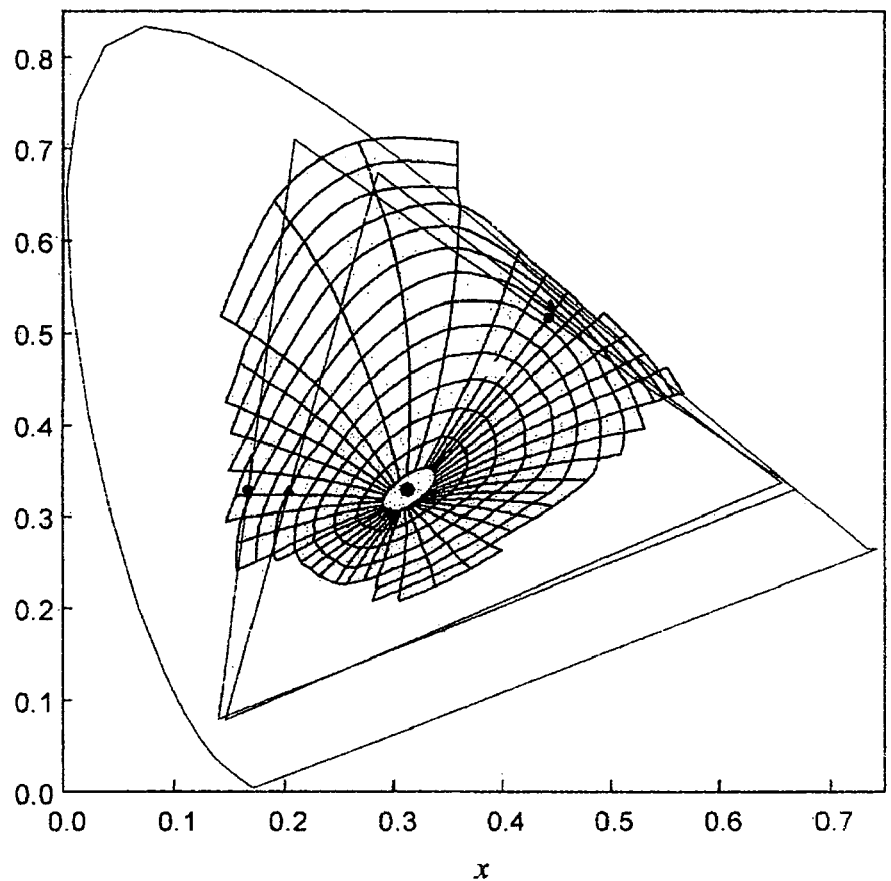
FIG. 4 shows iso-hue and iso-chroma trajectories when the value is 9 in a Munsell system.
Figure 5:
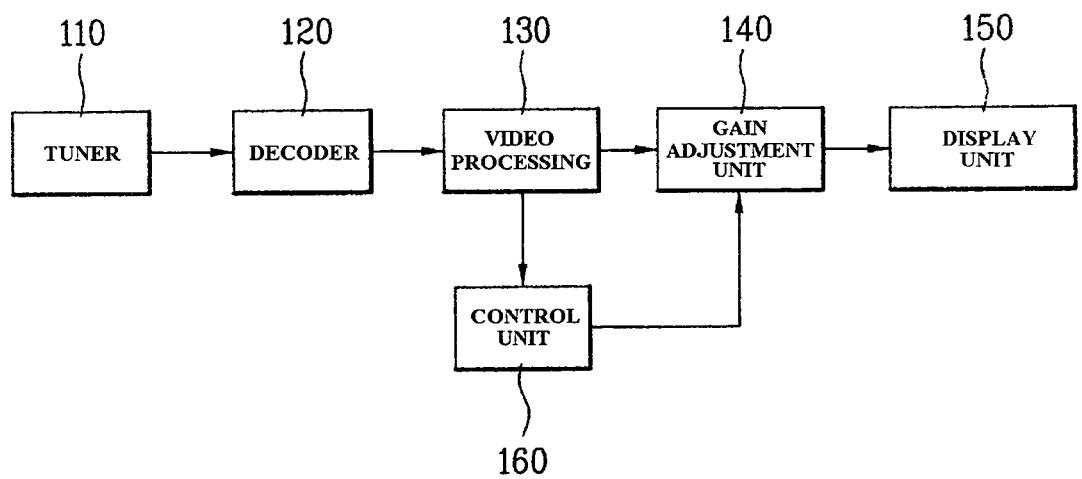
FIG. 5 is a block diagram showing a display apparatus according to a preferred embodiment of the present invention.

FIG. 5 is a block diagram showing a display apparatus according to a preferred embodiment of the present invention.

A display apparatus according to a preferred embodiment of the present invention includes a tuner 110 for selecting a desired channel; a decoder 120 for decoding broadcasting signals (Y, U, V) inputted from the selected channel; a video processing unit 130 for processing the decoded broadcasting signals into (R, G, B) signals; a gain adjustment unit 140 for adjusting the gain value of the (R, G, B) signals processed by the video processing unit 130; a display unit 150 for displaying the (R, G, B) signals the gain of which has been adjusted; and a control unit 160 for detecting skin color from the (R, G, B) signals processed by the video processing unit 130 and calculating luminance signal level to correct the luminance signal level of the (R, G, B) signals.

Figure 6:
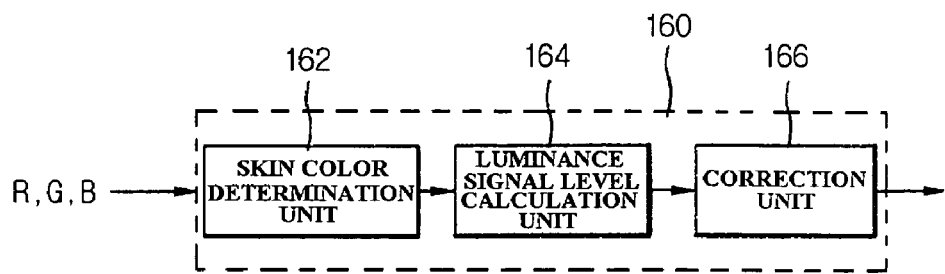
FIG. 6 is a block diagram illustrating a first embodiment of the control unit shown in FIG. 5.

FIG. 6 is a block diagram illustrating a first embodiment of the control unit 160 shown in FIG. 5. A skin color determination unit 162 and a luminance signal level calculation unit 164 are configured in series so that the skin color determination unit 162 receives (R, G, B) signals from the video processing unit 130 and transmits them to the luminance signal level calculation unit 164.

The skin color determination unit 162 of the control unit 160 obtains the ratio of (R, G, B) signals and detects a signal which has the same color phase as skin color. For example, when the ratio of G signal and R signal is 1:0.779±0.001 and the ratio of B signal and R signal is 1:0.718±0.001, it is determined that the (R, G, B) video signals include skin color.

The luminance signal level calculation unit 164 of the control unit 160 calculates luminance signal level as, for example, $Y=0.3\times(R/255)+0.59\times(G/255)+0.11\times(B/255)$ according to NTSC luminance signal calculation formula.

The correction unit 166 of the control unit 160 corrects the luminance signal level based on luminance signal level Y which has a hue difference perceived severely by the viewer's eyes. For example, the correction unit 166 corrects the luminance signal level when luminance signal level Y is less than 30%. When correcting the luminance signal level, the R, G, B signals are multiplied by arbitrary coefficients, respectively, so that luminance signal level Y is in the range of 30% to 100%. The control unit 160 may have a separate memory unit (not shown) to store the arbitrary coefficients.

If no skin color is detected by the skin color determination unit 162, the luminance signal level calculation unit 164 does not calculate the luminance signal level and the correction unit 166 does not perform skin color correction.

Figure 7:
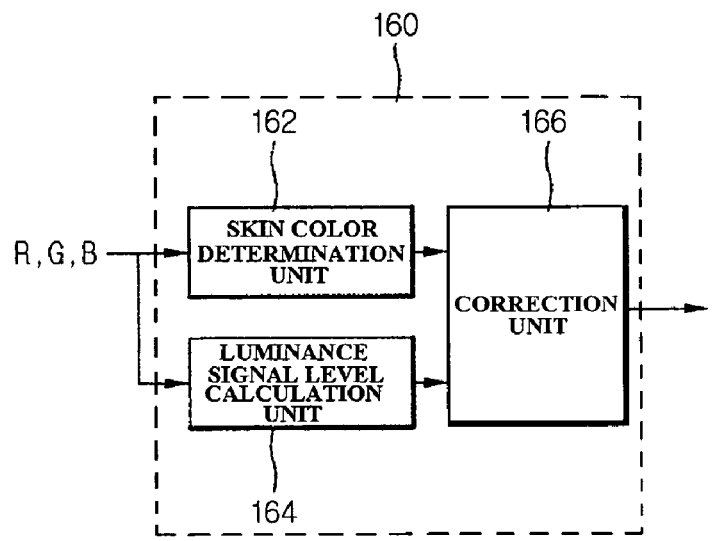
FIG. 7 is a block diagram illustrating a second embodiment of the control unit shown in FIG. 5.

FIG. 7 is a block diagram illustrating a second embodiment of the control unit shown 160 in FIG. 5. The skin color determination unit 162 and the luminance signal level calculation unit 164 are configured in parallel so that they can receive (R, G, B) signals from the video processing unit 130 in separate paths. Therefore, skin color detection in the skin color determination unit 162 and luminance level signal calculation in the luminance signal level calculation unit 164 are performed simultaneously. The correction unit 166 performs skin color correction based on results from the skin color determination unit 166 and the luminance signal level calculation unit 164.

Figure 8:
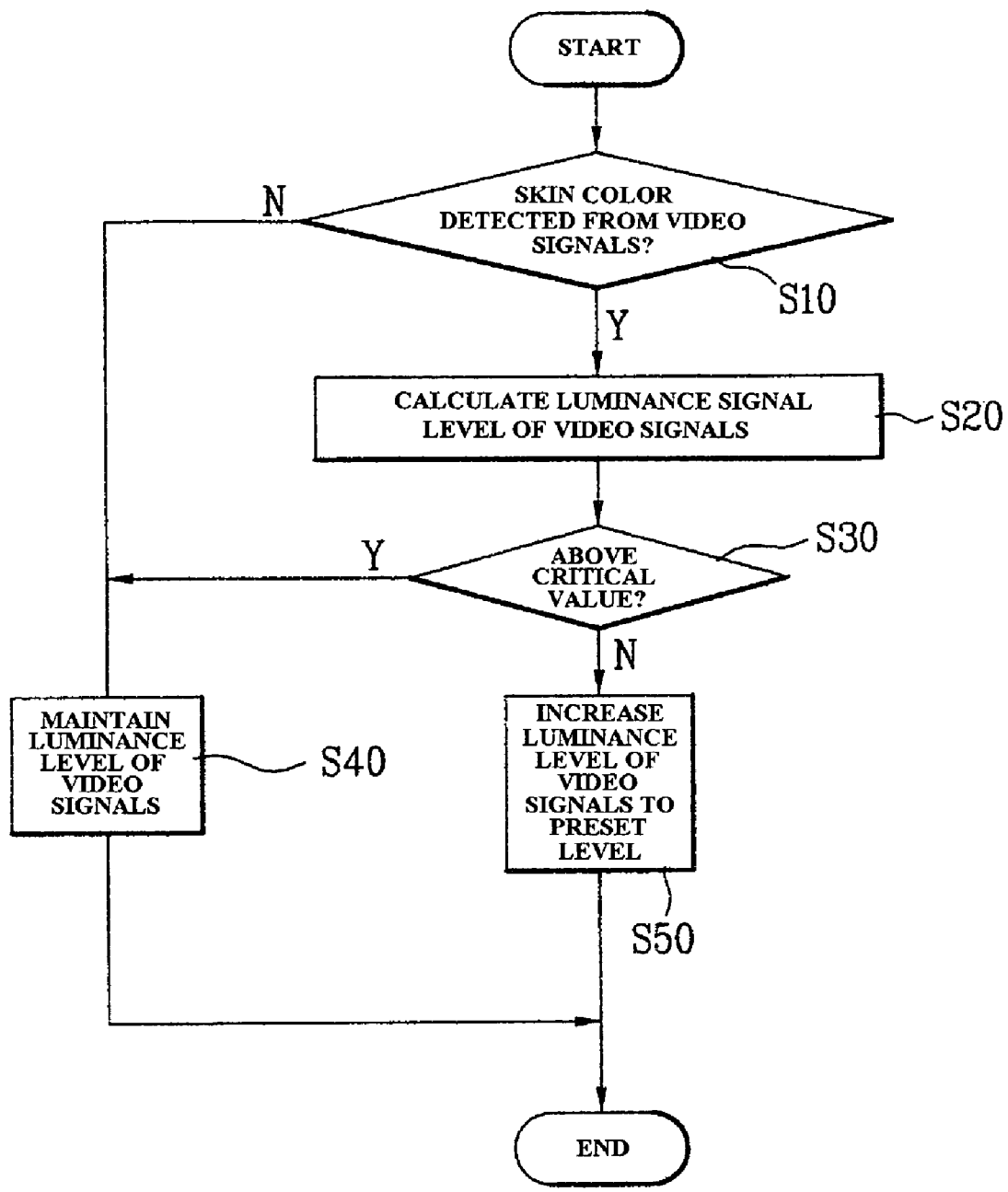
FIG. 8 is a flowchart showing a method for reproducing colors with a display apparatus according to a preferred embodiment of the present invention.

FIG. 8 is a flowchart showing a method for reproducing colors with a display apparatus according to a preferred embodiment of the present invention.

After the video processing unit processes (Y, U, V) signals into (R, G, B) signals, it is determined whether skin color is detected from the processed video signals or not (S10).

The ratio of the (R, G, B) signals is obtained and a signal having the same color phase as skin color is detected. For example, when the ratio of G signal and R signal is 1:0.779±0.001 and the ratio of B signal and R signal is 1:0.718±0.001, it is determined that the (R, G, B) video signals include skin color.

When it is determined that no skin color is detected from the video signals (S10), in other words, when any of the conditions that the ratio of G signal and R signal is 1:0.779±0.001 and that the ratio of B signal and R signal is 1:0.718±0.001 is not satisfied, the luminance level of the (R, G, B) video signals processed by the video processing unit is maintained (S40).

When it is determined that skin color is detected from the video signals (S10), the luminance signal level of the (R, G, B) video signals is calculated (S20). If the luminance signal level is calculated according to NTSC luminance signal calculation formula, it is calculated with regard to luminance signal level Y, particularly, based on formula: Y=0.3×(R/255)+0.59×(G/255)+0.11×(B/255).

The result of luminance signal level calculation is compared with a critical value to determine whether it is larger than the critical value or not (S30). The critical value is based on Y luminance signal level, when skin color is detected, which has a hue difference perceived severely by the viewer's eyes. For example, it is determined whether luminance signal level Y is larger than 30% or not.

When it is determined that luminance signal level Y is larger than the critical value (S30), the luminance level of video signals is maintained (S40).

When it is determined that luminance signal level Y is less than the critical value (S30), R, G, B signals are multiplied by arbitrary coefficients, respectively, so that luminance signal level Y is in the range of 30% to 100% (S50).

Then, video signals having increased luminance level are outputted on the display unit.

Figure 9:
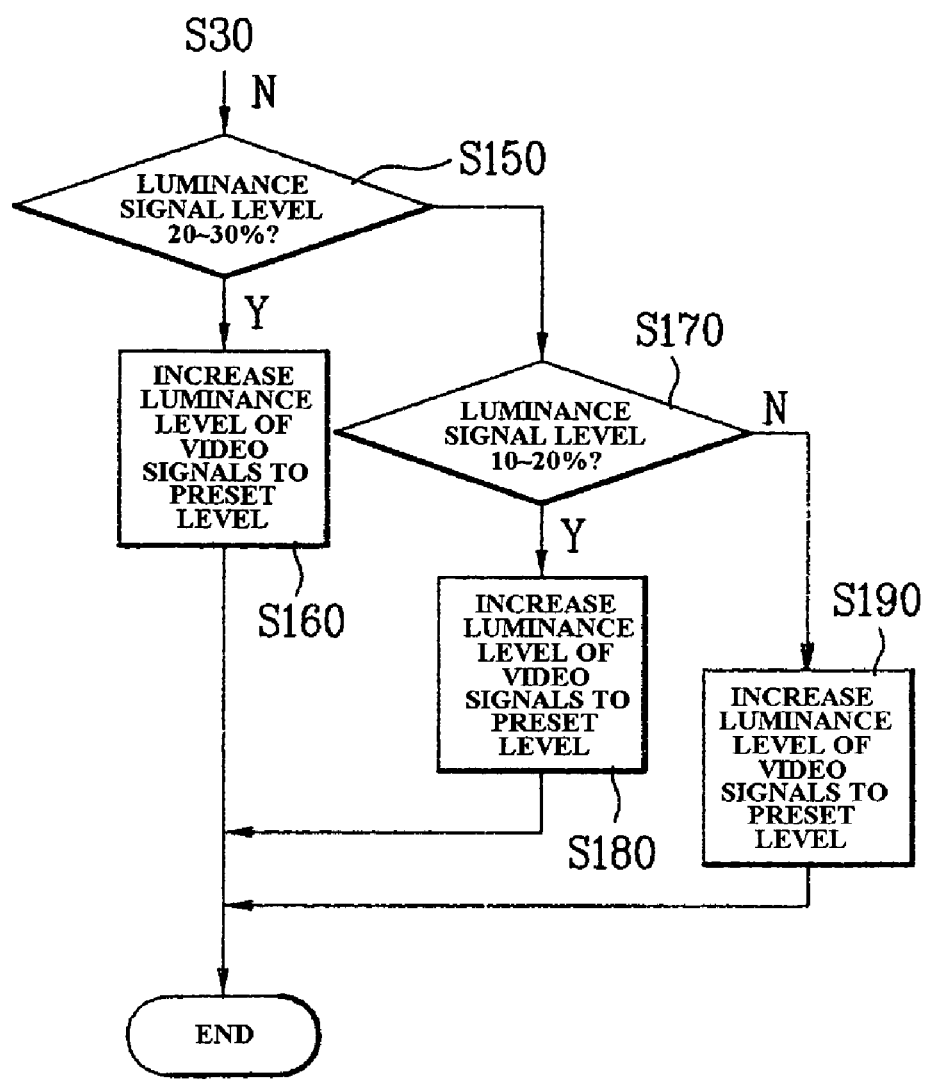
FIG. 9 is a flowchart illustrating in detail the step of correcting the luminance level of video signals shown in FIG. 8.

FIG. 9 is a flowchart illustrating in detail the step (S50) of correcting the luminance level of video signals shown in FIG. 8.

When it is determined that luminance signal level Y is less than the critical value (S30), it is determined whether the luminance signal level is in the range of 20% to 30% or not (S150).

When it is determined that luminance signal level Y is in the range of 20% to 30% (S150), the R, G, B video signals are multiplied by coefficients of 1% to 80%, respectively, so that luminance level Y of the video signals is in the range of 30% to 100% and the luminance level of the video signals is increased to a preset level (S160).

When it is determined that luminance signal level Y is not in the range of 20% to 30% (S150), it is determined whether the luminance signal level is in the range of 10% to 20% or not (S170).

When it is determined that luminance signal level Y is in the range of 10% to 20% (S170), the R, G, B video signals are multiplied by coefficients of 11% to 90%, respectively, so that luminance level Y of the video signals is in the range of 30% to 100% and the luminance level of the video signals is increased to a preset level (S180).

When it is determined that luminance signal level Y is not in the range of 10% to 20% (S170), the R, G, B video signals are multiplied by coefficients of 29% to 100%, respectively, so that luminance level Y is in the range of 30% to 100% and the luminance level of the video signals is increased to a preset level (S190).

Then, video signals having increased luminance level are outputted on the display unit.

As mentioned above, the display apparatus and the method for reproducing colors therewith according to the present invention can realize accurate color reproduction by reducing color error, which can be sensed by the viewer's eyes, with regard to skin color in low luminance level.

The forgoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A display apparatus for receiving a broadcast signal, the display apparatus comprising:
    a video processor that processes the received broadcasting signal into (R, G, B) signals, the processed (R, G, B) signals including a luminance signal having a level based on the received broadcast signal;
    a gain adjustment device that adjusts respectively gain values of the processed (R, G, B) signals according to a corrected luminance signal;
    a display that displays the (R, G, B) signals, the gain of which has been adjusted;
    a skin color determination device that determines skin color presence in the processed (R, G, B) signals by obtaining a ratio of the processed (R, G, B) signals;
    a luminance signal level calculation device that calculates a luminance signal level based on the processed (R, G, B) signals; and
    a correction device that performs skin color correction by increasing the luminance signal level of the processed (R, G, B) signals, when skin color presence is determined and the calculated luminance signal level is less than a critical value, and that outputs the corrected luminance signal to the gain adjustment device.

2. The display apparatus of claim 1, wherein the skin color determination device determines skin color presence in the processed (R, G, B) video signals when the ratio of G signal and R signal is 1:0.779±0.001 and the ratio of B signal and R signal is 1:0.718±0.001.

3. The display apparatus of claim 1, wherein the luminance signal level calculation device is adapted to calculate luminance signal level using a formula:

$$Y=0.3\times(R/255)+0.59\times(G/255)+0.11\times(B/255).$$

4. The display apparatus of claim 1, wherein the correction device is adapted to multiply the (R, G, B) signals by arbitrary coefficients, respectively, so that, when the calculated luminance signal level is less than 30%, the corrected luminance signal increased to a level in the range of 30% to 100%.

5. The display apparatus of claim 4, further comprising a memory device that stores the arbitrary coefficients.

6. The display apparatus of claim 1, wherein the skin color determination device and the luminance signal level calculation device are connected in parallel so that they can receive (R, G, B) signals from the video processor in separate paths.

7. The display apparatus of claim 1, wherein the skin color determination device and the luminance signal level calculation device are connected in series so that the skin color determination device receives (R, G, B) signals from the video processor and transmits them to the luminance signal level calculation device and the luminance signal calculation device is adapted to calculate luminance signal level only when skin color is detected by the skin color determination device.

8. A method for reproducing colors with a display apparatus that receives a broadcast signal, the method comprising:
processing the received broadcasting signal into (R, G, B) video signals, the processed (R, G, B) signals including a luminance signal having a level based on the received broadcast signal;
determining skin color presence in the processed (R, G, B) signals;
calculating a luminance signal level based on the processed (R, G, B) signals;
performing skin color correction by increasing the luminance signal level of the processed (R, G, B) signals when said determining determines skin color presence and the calculated luminance signal level is less than a critical value, to output a corrected luminance signal;
respectively adjusting gain values of the processed (R, G, B) signals according to the corrected luminance signal; and
displaying the (R, G, B) signals, the gain of which has been adjusted.

9. The method of claim 8, further comprising:
obtaining a ratio of the G signal to the R signal and a ratio of the B signal to the R signal, using the processed (R, G, B) signals, wherein skin color presence is determined when the obtained G-to-R signal ratio is 1:0.779±0.001 and the obtained B-to-R signal ratio is 1:07.18±0.001.

10. The method of claim 8, wherein the luminance signal level is calculated using a formula:

$$Y=0.3\times(R/255)+0.59\times(G/255)+0.11\times(B/255).$$

11. The method of claim 8, wherein the skin color correction is performed by multiplying the (R, G, B) signals by arbitrary coefficients, respectively, so that the corrected luminance signal is increased to a level in the range of 30% to 100% when the calculated luminance signal level is less than 30%.

12. The display apparatus of claim 1, wherein the skin color correction is performed by respectively multiplying the (R, G, B) video signals by coefficients of 0.01~0.80, so that the corrected luminance signal is increased to a level higher than the critical value, when the calculate luminance signal level has a value of 0.2~0.3; respectively multiplying the (R, G, B) video signals by coefficients of 0.11~0.90, so that the corrected luminance signal is increased to a level higher than the critical value, when the calculated luminance signal level has a value of 0.1~0.2; and respectively multiplying the (R, G, B) video signals by coefficients of of 0.29~1.00, so that the corrected luminance signal is increased to a level higher than the critical value, when the calculated luminance signal level has a value less than 0.1.

13. The method of claim 8, wherein the skin color correction is performed by respectively multiplying the (R, G, B) video signals by coefficients of 0.01~0.80, so that the corrected luminance signal is increased to a level higher than the critical value, when the calculated luminance signal level has a value of 0.2~0.3; respectively multiplying the (R, G, B) video signals by coefficients of 0.11~0.90, so that the corrected luminance signal is increased to a level higher than the critical value, when the calculated luminance signal level has a value of 0.1~0.2; and respectively multiplying the (R, G, B) video signals by coefficients of 0.29~1.00, so that the corrected luminance signal is increased to a level higher than the critical value, when the calculated luminance signal level has a value less than 0.1.

* * * * *